United States Patent [19]

Minns et al.

[11] Patent Number: 5,373,576
[45] Date of Patent: Dec. 13, 1994

[54] HIGH POWER OPTICAL FIBER

[75] Inventors: Richard A. Minns, Arlington; Bennett H. Rockney, Westford; Ying H. Zhang, Waltham, all of Mass.

[73] Assignee: Polaroid Corporation, Cambridge, Mass.

[21] Appl. No.: 57,502

[22] Filed: May 4, 1993

[51] Int. Cl.$^5$ .................................................. G02B 6/20
[52] U.S. Cl. ..................................... 385/125; 385/126; 385/127; 372/6; 359/341
[58] Field of Search ............... 372/6; 359/341; 385/122, 125, 126, 127

[56] References Cited

U.S. PATENT DOCUMENTS

| | | | |
|---|---|---|---|
| H15 | 1/1986 | Chraplyvy | 372/3 |
| 3,920,980 | 11/1975 | Nath | 362/32 |
| 4,201,446 | 5/1980 | Geddes et al. | 385/125 |
| 4,425,794 | 1/1984 | Duesbury | 73/293 |
| 4,448,483 | 5/1984 | Ryley, Jr. | 385/68 |
| 4,465,805 | 8/1984 | Blizzard et al. | 524/765 |
| 4,603,940 | 8/1986 | Shaw et al. | 385/30 |
| 4,618,258 | 10/1986 | Hicks, Jr. | 365/73.1 |
| 4,640,592 | 2/1987 | Nishimura et al. | 385/125 |
| 4,647,767 | 3/1987 | Jubinski | 250/227.25 |
| 4,815,079 | 3/1989 | Snitzer et al. | 372/6 |
| 4,922,496 | 5/1990 | Po | 372/6 |
| 4,938,556 | 7/1990 | Digonnet et al. | 359/341 |
| 5,024,507 | 6/1991 | Minns et al. | 385/145 |
| 5,108,200 | 4/1992 | Nonaka et al. | 385/16 |
| 5,121,460 | 6/1992 | Tumminelli et al. | 385/126 |
| 5,268,978 | 12/1993 | Po et al. | 385/33 |

Primary Examiner—Frank Gonzalez
Attorney, Agent, or Firm—Francis J. Caufield

[57] ABSTRACT

A fiber optic laser pumped via its cladding has a liquid component in the cladding and an index of refraction sufficient to promote total internal reflection of light carried by the cladding for pumping the laser. In one embodiment, the liquid component is provided by immersing the fiber clad with a curable polymer and a protective coating in a fluorinated organic compound.

21 Claims, 4 Drawing Sheets

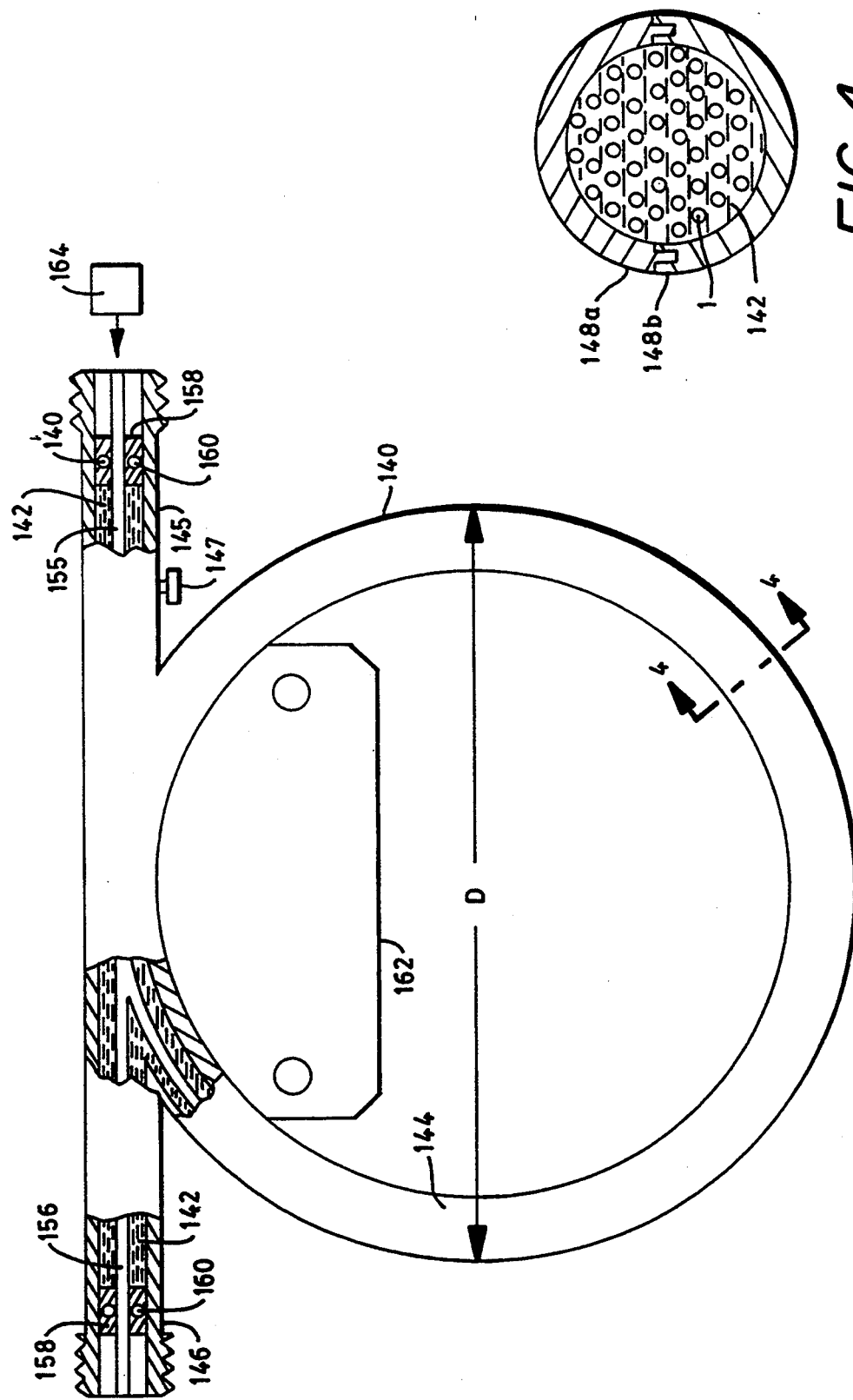

HIGH POWER OPTICAL FIBER

BACKGROUND OF THE INVENTION

The present invention pertains to active and passive optical fibers and material systems for cladding such optical fibers, and, in particular, to optical fiber claddings having a liquid component. Such claddings improve the optical performance of optical fibers, especially those which carry substantial optical power.

In an optical fiber, light is guided by total internal reflection (TIR) in a transparent core surrounded by a transparent cladding of lower index of refraction. Under ideal lossless conditions, light can be guided with nearly perfect efficiency. In practice, however, fibers can be affected with a variety of more or less severe losses.

At least three major loss mechanisms that reduce transmission efficiency have been identified. Absorption, resulting from impurities in the core or cladding, causes an exponential reduction in transmission with propagation distance. Rayleigh scattering, caused by localized variations in the refractive index of the core and cladding, appears to result from density variations in the core and cladding materials. Major factors which affect density are the uniformity of the starting materials and lay down parameters. Imperfections in the core/cladding interface, which also may result from material variations and lay down parameters, cause the third well-recognized loss mechanism.

Substantial progress has been made in improving fiber performance by reducing or minimizing these loss mechanisms. And, these improvements have resulted in broadened applications for optical fibers. For example, optical fibers have become attractive as laser oscillators and amplifiers. Such devices combine the excellent properties of laser materials with the high energy confinement available in optical fibers. In particular, single mode fibers have been adapted as optical fiber lasers for a variety of system applications. Such fibers exhibit large energy conversion efficiencies and have excellent coupling properties to single mode transmission fibers and, therefore, have important applications in telecommunications fiber transmission systems and networks.

As with other types of lasers, the performance of optical fiber lasers also is measured in terms of slope efficiency. The ultimate performance of a fiber laser device having a known quantum efficiency, the maximum probability that a photon of a particular wavelength produced by a pump source will be converted to laser light at the wavelength of interest, is related to the slope efficiency. This is, the efficiency with which pump radiation can be absorbed and converted to useful laser light by the active material and, in particular, the active material in the fiber core. Snitzer et al., U.S. Pat. No. 4,815,079, issued on Mar. 21, 1989, incorporated herein by reference, discloses a fiber configuration which promotes efficient coupling of radiation to an active single mode core enclosed within a relatively large multimode cladding which, in turn, is surrounded by a light confining outer cladding.

Minns et al., U.S. Pat. No. 5,024,507, issued Jun. 18, 1991, (Minns '507) and Minns, U.S. patent application Ser. No. 07/720,233 (still pending) filed Jun. 24, 1991 (Minns '233), both of which are incorporated by reference, disclose various photopolymerizable compositions for cladding optical fibers. These materials have a remarkably low index of refraction and have essentially no absorption at 807 nm, a particularly useful property at that wavelength. Also, these materials are easily coated on fiber by means of a draw tower.

When these materials are employed as claddings in active devices such as an optical fiber laser having a duty cycle during which high power output (e.g., 2 watts and above) is produced, the slope efficiency degrades with repetitive use with the cladding of Minns '233. Further, it has been found that scattering losses in the multimode core of the fiber appear to increase. While the exact cause is unclear, it is postulated that the polymer cladding may locally delaminate from the glass multimode core resulting in lossy scattering sites at the core/cladding interface.

SUMMARY OF THE INVENTION

The present invention is based upon the discovery that certain fluid components can be beneficially used to improve the optical properties of the cladding system of an optical fiber operating at high power as evidenced by constant slope efficiency with high power repetitive use.

In one embodiment, an optical fiber laser has a single mode core and a first multimode cladding layer surrounding the core. A light confining second cladding layer surrounding the first cladding includes a fluid component which improves the slope efficiency of the laser. In another embodiment, a fiber optic has a core portion having an index of refraction $n_1$ disposed in a housing containing a fluid surrounding the core. The fluid has an index of refraction $n_2$. The relationship of $n_1$ to $n_2$ is sufficient to result in total internal refraction (TIR) within the core.

The invention also relates to a cladding for an optical fiber comprising a liquid component substantially free of OH species; and a curable component to form a cross-linked layer. When combined and in the cured state, the components exhibit a substantially uniform index of refraction at least near the core/cladding interface.

In yet another embodiment, the liquid component causes the curable component to swell radially when combined therewith. A semipermeable protective coating surrounds the curable component to confine the liquid component therein. The coating has a tensile strength sufficient to withstand a radial pressure caused by the swelling while remaining intact.

In an exemplary embodiment, the liquid component is a fluorinated organic compound such as a fully fluorinated alkane. The curable component is a polymerizable composition such as an unsubstituted or fluorosubstituted diacrylate monomer, a fluorinated monofunctional acrylate monomer and a photoinitiator. Alternatively, the curable component is a photopolymerizable composition comprising a copolymer having repeating units from a photoinitiator monomer having a photoinitiating group and an ethylenically unsaturated group, and repeating units from a fluorosubstituted monomer having an ethylenically unsaturated group; and a fluorosubstituted diacrylate. The protective coating is a curable polymer containing multifunctional acrylates and a radiation cure initiator.

DESCRIPTION OF THE DRAWINGS

The principles of the present invention may be clearly understood by considering the following detailed description in conjunction with the accompanying drawings in which:

FIG. 3 is a fragmentary plan view of a device constructed in accordance with the teachings of the present invention;

FIG. 4 is a cross-section taken along line 4—4 of the embodiment illustrated in FIG. 3;

DESCRIPTION OF THE INVENTION

Figure 1:
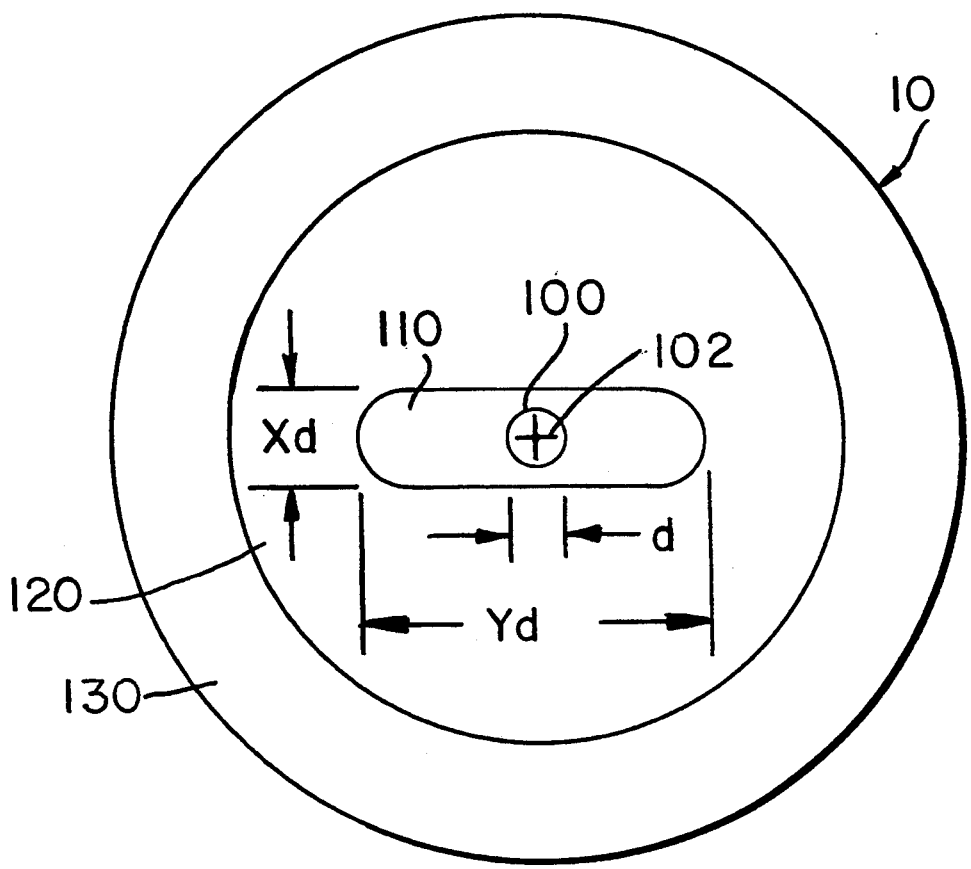
FIG. 1 shows, in pictorial form, a cross-section of an optical fiber forming a component of an exemplary embodiment of the present invention.

FIG. 1 shows, in pictorial form, a cross-section of a multilayer optical fiber 10 which forms a component of an exemplary embodiment of the present invention. The fiber 10 is formed of a single mode core 100: a first multimode cladding layer 110; a second or further cladding layer 120: and a protective coating 130. The core 100, located on the central axis 102 of the fiber 10, has an index of refraction $n_1$. The core 100 may comprise, for example, pure $SiO_2$ (fused silica) doped with a gain species such as a rare earth, e.g., $Nd^{3+}$. The core 100 may have additional dopants such as aluminum, germanium and phosphorous, which are employed in a known manner to elevate the index of refraction, prevent devitrification or enhance the solubility of $SiO_2$ for rare earth dopants. The first multimode cladding layer 110 surrounding core 100 has an index of refraction $n_2$ and may be, for example, pure fused silica. If desired, first cladding layer 110 may be doped with fluorine to lower the index of refraction, and the core 100 may be undoped. In the embodiment shown, the cladding layer 110 is in the forth of an elongated slab having a substantially rectangular cross-section.

The second or further cladding layer 120 surrounds the multimode cladding layer 110 and has an index of refraction $n_3$ which is lower than the index of refraction $n_2$ of the first cladding 110. In the embodiments described herein, the further cladding layer 120 preferably is a cross-linked polymeric material having a liquid component. As hereinafter described, the further cladding layer 120 may, in turn, be surrounded by the protective coating layer 130, preferably a radiation curable acrylate.

A laser pump source (not shown in FIG. 1, but see FIG. 3) provides pump light to the fiber 10. The core 100 is arranged in a well-known manner to propagate light in single mode at the wavelength of interest and produces, when excited with a sufficient number of photons, laser light output at a wavelength determined by the lasing dopant and the characteristics of the single core acting as a cavity with suitable feedback. The cladding 110 acts as a cladding for the single mode core 100 but also acts as a multimode core for receiving the laser pump light. The further cladding 120 acts as a cladding for the multimode core (cladding 110) to confine the pump light in the cladding 110 along the length of the laser 10. This light is absorbed by the innermost core 100 as it passes through it multiple times. Pump light may be provided by laser diodes, phased array laser diodes, or other sources.

In general, the ratio of the number of modes trapped in multimode cladding 110 to the number of modes trapped in single-mode core 100 is determined by the ratio of the cross-sectional area of cladding 110 to the cross-sectional area of core 100 and the square of the numerical aperture (NA) for the multimode fiber formed between region 110 and 120. It is preferable that this area ratio be substantially in the range of 50–1000 to 1, although other values would function properly. Thus, if the diameter of core 100 is denoted by d and, as shown in FIG. 1, the height of cladding 110 is given by $x_d$ and the width by $y_d$, then it is desirable that $x_d y_d$ be substantially in the range of 50 to 400. Thus, preferred embodiments of the inventive fiber would have dimensions such that $2 < x_d < 5$ and $5 < y_d < 100$.

Figure 2:
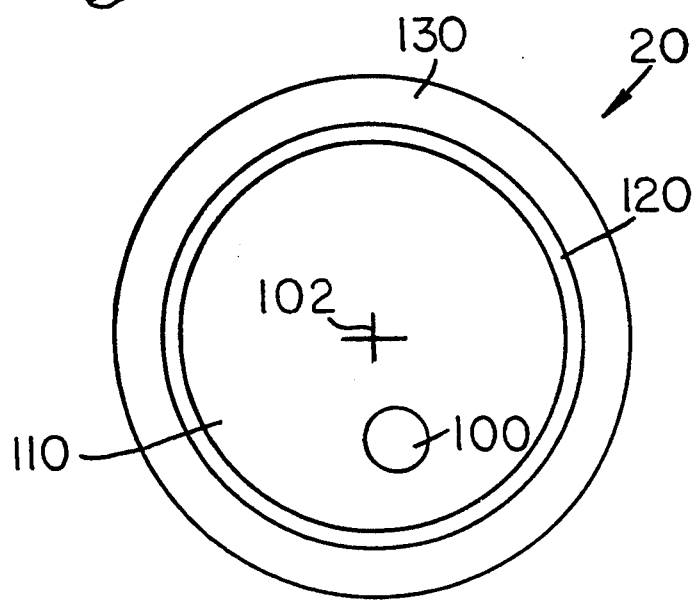
FIG. 2 shows an alternative form of the optical fiber shown in FIG. 1.

In FIG. 2, similar elements have reference numerals corresponding to those in FIG. 1. An optical fiber 20 which forms a component of another exemplary embodiment of the invention has a single mode core 100 offset from the central axis 102. The multimode cladding 110 has a circular cross section and is surrounded by the further or second cladding layer 120 which, in turn, is surrounded by the protective coating layer 130. The function of the core 100, the cladding layers 110 and 120 and the coating layer 130 are similar to those elements as discussed above.

The fiber structure 20 shown in FIG. 2, like the embodiment of FIG. 1, employs, for example, a fused silica, $Nd^{3+}$ ion-doped, single mode core 100 having additional impurities such as aluminum, germanium, or phosphorous. The diameter of the multimode cladding 110 is generally in the range of 40 to 80 microns and the diameter of single mode core 100 being substantially in the range of 3 to 8 microns.

In the exemplary embodiments above, the laser material comprises $Nd^{3+}$ having concentrations substantially in the range of about $0.5 \times 10^{20}$ ions/cc to about $5 \times 10^{20}$ ions/cc, preferably $1 \times 10^{20}$ ions/cc to about $5 \times 10^{20}$ ions/cc. Alternatively, the laser material comprises $Yb^{3+}$ having concentrations substantially in the range of about $1 \times 10^{20}$ ions/cc to about $20 \times 10^{20}$ ions/cc. In yet another alternative, the laser material comprises $Er^{3+}$ having concentrations substantially in the range of about $0.1 \times 10^{20}$ ions/cc to about $2 \times 10^{20}$ ions/cc. $Nd^{3+}$ and $Yb^{3+}$ as well as $ER^{3+}$ and $Yb^{3+}$ may be employed as co-dopants as detailed in Snitzer et al., '079. Other rare earths may also be beneficially employed.

FIGS. 3 and 4 illustrate an embodiment of the invention in which the fiber component 10 is located in a hollow housing 140 filled with a fluid 142. The housing 140 is in the form of a loop portion 144 having respective opposed input and output portions 145 and 146. A fluid fill port 147 may be provided. The housing 140 may be formed as open interlocking half sections 148A and 148B. The fiber 10 is disposed in the loop 140 as a series of multiple windings. Ends 155 and 156 of the fiber 10 are secured in the corresponding input and output portions 145 and 146 of the housing 140 by means of end fittings 158 and "O" ring seals 160, as shown, to contain the fluid 142 within the housing 140. An apertured hold down 162 is attached to the housing 140 as shown. The fluid 142 surrounding the fiber 10 has an index of refraction $n_4$ which preferably substantially matches the index of refraction $n_3$ of the second cladding layer 120. Input energy from a pump source 164 may be employed to end pump or side pump the fiber 10 as described in Snitzer et al., '079. As mentioned, the pump source 164 may be a semiconductor phased array laser having an output of about 10-15 watts.

In one embodiment of the invention, the second cladding 120 is preferably a two component system initially comprising a liquid component, and a curable component, such as Minns '233. When combined, the liquid component and curable component have compatible indices of refraction at least near the core/cladding interface. While the liquid component may be useful as a cladding material alone, as a practical expedient, the cladding 120 is predominantly a curable cross-linked high molecular weight (HMW) polymer modified by contact with a low molecular weight (LMW) liquid.

In yet another embodiment, the fiber 10 may be immersed in the liquid component for a time sufficient to combine with the cured component, and thereby improve the optical properties. In such an arrangement, if the liquid component is retained in a diffused mixture with the cured component the fiber 10 and surrounding liquid 142 need not necessarily be sealed in the housing 140, although such an arrangement may be conveniently employed. A protective coating 130 in the form of a radiation curable polymer may be employed over the two component cladding 120.

In one embodiment of the invention, the fluid component comprises a fluorinated organic compound such as a fully fluorinated alkane. Exemplary materials are sold under the trademark Fluorinert TM by 3M Company, St. Paul, Minn. The Fluorinert TM materials are members of a family of completely fluorinated organic compounds that have advantageous properties including specific heat which allows the material to act as a coolant for high thermal stability. An important advantage of such materials is that the index of refraction generally matches that of the curable component of the cladding 120 thereby minimizing a source of scattering loss. The materials also have low chemical reactivity, moderately low vapor pressure, and are environmentally benign in terms of ozone depleting capability. A particular material which has been found to be useful as the fluid component is a Fluorinert TM designated as FC-40 by 3M Co.

It has been found that when a liquid such as water is introduced into the housing 40, the performance of the laser temporarily stabilizes but ultimately degrades with the onset of OH absorption, with an absorption line at 950 nm (the $H_2O$ line) appearing. Thus, it appears that a portion of the pumping energy is absorbed in the $H_2O$ band as a result of infiltration of the fluid through the curable component of the cladding 120. The use of the Fluorinert TM material, which does not have OH substituents, does not degrade the laser output after prolonged immersion.

The curable component of the cladding 120 may be one of a variety of suitable polymeric materials having a desired index of refraction. One material is set forth in Minns, '507 referred to above which comprises an unsubstituted or fluorosubstituted diacrylate monomer, a fluorinated monofunctional acrylate monomer in an amount of from about 2 to about 12 parts by weight of the diacrylate monomer, a photoinitiator, and a viscosity modifying agent to increase the viscosity of the composition to a range from about 1,000 to about 15,000 cP. Upon photocuring, the material forms a cross-linked composition having a refractive index not greater than about 1.43.

Another material suitable for use as the curable component is a polymeric material such as set forth in Minns '233 referred to above which comprises a photoinitiator monomer having both a photoinitiating group and an ethylenically unsaturated group reacted with a fluorosubstituted monomer having an ethylenically unsaturated group resulting in a copolymer having pendant photoinitiating groups. The copolymer is then mixed with a fluorosubstituted diacrylate forming a photopolymerizable cross-linkable composition which is coated on the optical fiber and exposed to UV light. The cladding has a refractive index below about 1.35.

The Minns '233 materials have been found to soften and swell when immersed in the Fluorinert TM. The protective coating 130 is employed to preserve the physical integrity of the cladding layer 120 and to act as a semipermeable membrane to allow the liquid component to diffuse into the curable component to thereby improve the optical properties of the fiber.

In an exemplary embodiment, the Minns '233 is coated on an active fiber optic laser and overcoated with a high tensile strength polymeric protective coating 130 such as urethane acrylate sold under the trademark DeSolite by DeSoto, Des Plains, Ill. When a coated fiber optic laser is immersed in the Fluorinert TM, the laser shows an improvement in its slope efficiency after the passage of time. It is possible that the protective coating 130, while retaining its structural integrity, still allows the liquid component to diffuse into the curable component.

The protective coating 130 appears to have sufficient strength to withstand hoop stress generated by the pressure exerted by the liquid component. In turn, this may exert an inward acting radial force or stress on the cladding layer 120 in opposition to the force caused by the swelling of cladding layer 120. As hereinafter noted, the force or stress imparted by the protective coating 130 is thought to cause improved optical performance.

It is postulated that, as the curable component swells, it exerts pressure on the interface between the cladding layers 110 and 120, reducing the size of scattering sites and thereby improving slope efficiency. Alternatively, the liquid component may diffuse within the curable component of the cladding 120, filling scattering sites with a fluid matching the index of refraction of the polymer, whereby scattering losses are reduced. While the particular mechanism whereby the improvement of the present invention occurs is not completely understood, the advantageous increase in slope efficiency is nevertheless measurable as hereinafter illustrated. In either case the liquid component and curable component preferably have similar indices of refraction.

Figure 5:
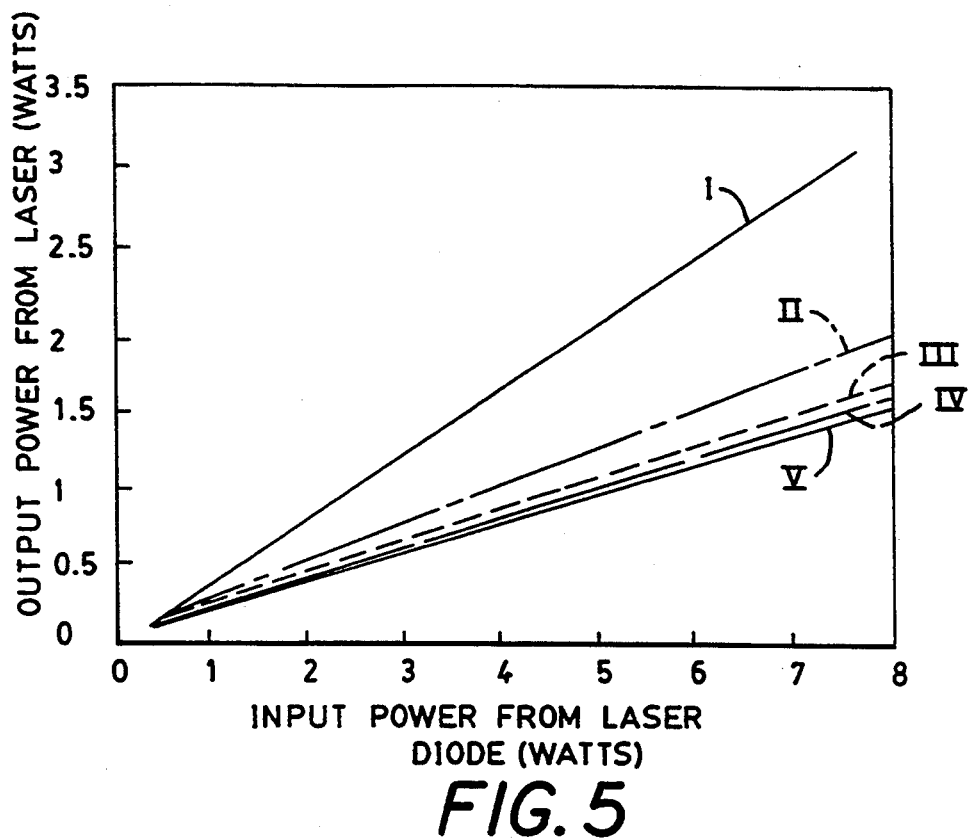
FIGS. 5 and 6 are graphical representations of the performance of various embodiments of the present invention.

FIG. 5 is a graphical representation of the slope efficiency of a fiber optic laser, defined as the ratio of the output power to the input power in watts. In FIG. 5, curve I illustrates the initial output power versus input for a fiber which is similar to the fiber in FIG. 1 but without the fluid component in the cladding layer 120. The initial results (I) are good showing a slope efficiency of about 0.415. However, if the laser is shut off and activated at a later time, the slope efficiency is dramatically reduced as illustrated by curves II-V, each taken successively on separate occasions and after shutting off the laser. The results of FIG. 5 illustrate that the operation of a fiber optic laser, having a cladding without the liquid component, degrades from an initially good result after subsequent high power duty cycle operations.

Figure 6:
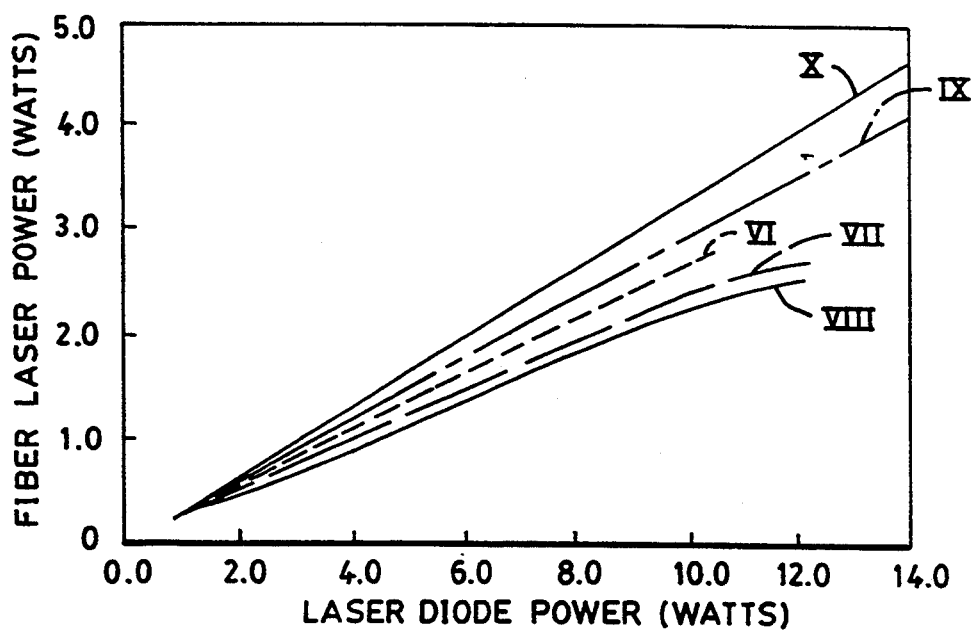

FIG. 6 illustrates the results employing the teachings of the present invention in which the polymer coated laser fiber 10 is immersed in a liquid such as Fluorinert ™ FC-70 fluid. Curve VI represents behavior of a fiber optic laser upon an initial high power duty cycle activation. Curves VII–X illustrate the slope efficiency after subsequent high power duty cycle operations. Curves VII and VIII show the results upon reactivation of the laser six hours and nine hours after initial activation, respectively. Curves IX and X illustrate the results upon reactivation 30 and 48 hours after initial activation, respectively. FIG. 6 shows an initial decrease in the operation of the laser shortly after immersing the laser fiber 10 in the fluid 30 (Curves VII and VIII). However, after prolonged immersion in the fluid 30, the laser shows improved slope efficiency (Curves IX and X); that is the ratio of output power to the input power increases from the initial nominal value after prolonged immersion in the fluid 30. It is evident from the comparison of FIGS. 5 and 6, that there is an improvement in the initial slope efficiency of the fiber laser 10 when the photocured polymer component of the cladding layer 120 is subjected to immersion in a fluorinated liquid component for a prolonged period.

An active fiber optic laser coated with the Minns '233 material having a protective DeSoto overcoating 130 was immersed in Fluorinert ™ for several weeks and then removed. After drying it was then operated at intervals of over several days. It was found that performance was stable during the first few days but degraded thereafter. This suggests that the fluid component may be driven off by a mechanism not yet fully understood but likely to be evaporation. Thus, it is preferred to maintain the fiber immersed in the Fluorinert ™ liquid component. Other materials with similar beneficial properties, but with lower vapor pressure, such as Fomblin ® Y06/6 and Fomblin ® Z25, marketed by Ausimont, Morristown, N.J., are also operative to enhance the optical properties without being immersed, except to initially saturate the polymer component.

As noted above, the mechanism for the improved performance of the cladding of the present invention is not fully understood or characterized, but it appears to be what, for convenience, will be referred to as either a void filling or void collapsing mechanism. Voids or surface discontinuities formed at the interface between the cladding layers 110 and 120, for example, result in scattering sites. In void collapsing, the polymer component of the coating 120 is caused to soften and swell upon prolonged immersion in the liquid component and the protective coating 130 constrains the swollen cladding causing the voids to collapse. In void filling, the liquid component diffuses into the polymer component of the coating 120 and fills the scattering sites or voids near the interface between the cladding layers 110 and 120. In the void filling arrangement, the index of refraction of the liquid and the polymer components should be virtually identical. If void collapsing is the mechanism, it is not clear whether the indices of refraction of the polymer and liquid components should be identical. However, the overall effect should be that the index of refraction of the cladding layer 120 should be substantially uniform so as to avoid creation of scattering sites due to variations in the index of refraction of the cladding 120.

Figure 7:
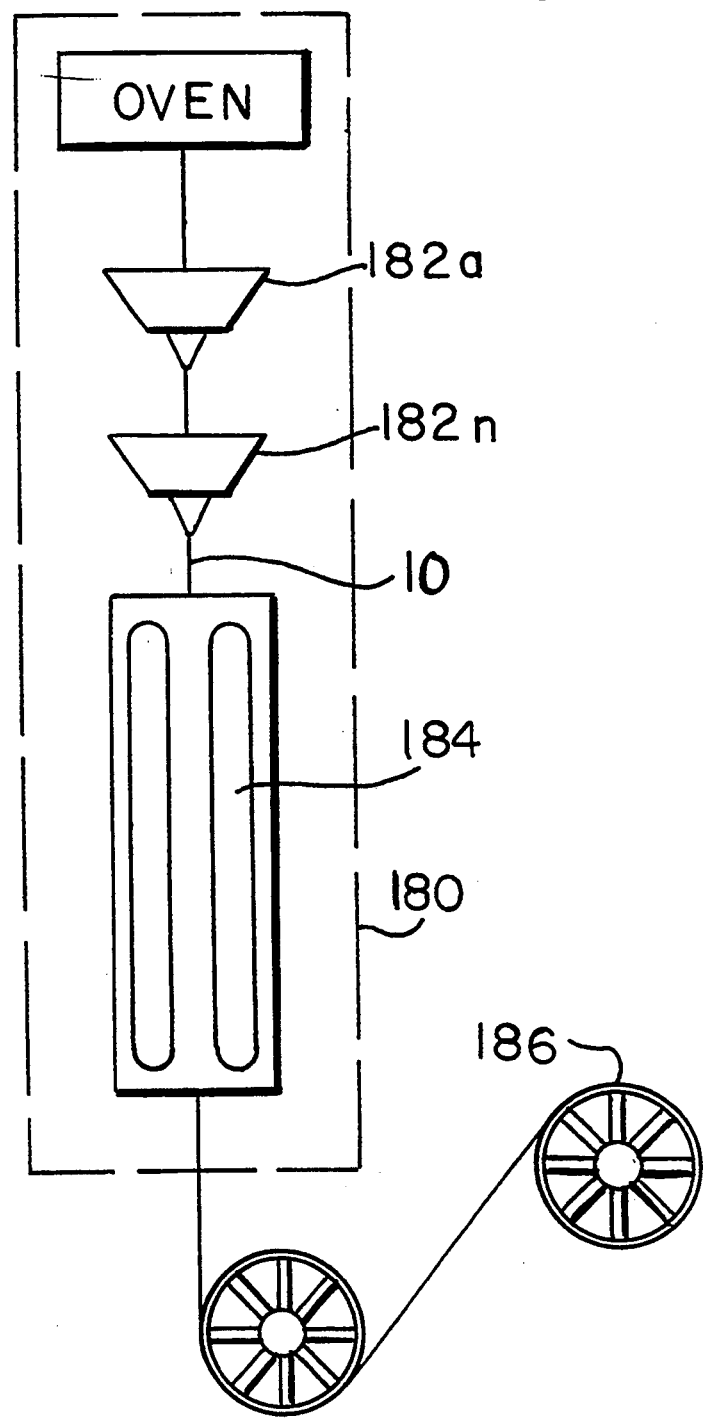
FIG. 7 is a schematic illustration of a process employing a multistage draw tower for coating an optical fiber.

The fiber 10 may be coated as it is drawn by well-known techniques. For example, in FIG. 7, a multistage draw tower 180 has a series of draw cups 182a–182n mounted along the path of the fiber 10. One or more UV cure stations 184 (one shown) may be disposed along the path for curing the fiber using UV radiation. Pull roll 186 draws the fiber 10 through the tower 180 in a known manner. In such an arrangement, the cladding layer 120 and the protective coating 130 may be deposited and cured on the draw sufficiently and at relatively high speed. An example of a coating process is set forth in Snitzer et al. '079.

While there has been described what at present are considered to be the preferred embodiments of the present invention, it will be readily apparent to those skilled in the art that various changes and modifications may be made therein without departing from the invention, and it is intended in the appended claims to cover such changes and modifications as fall within the true spirit and scope of the invention.

What is claimed is:

1. An optical fiber system comprising:
   a substantially single mode core having an index of refraction $n_1$, comprising a laser material, and disposed within a multimode cladding having an index of refraction $n_2$;
   a further cladding having an index of refraction $n_3$ surrounding said multimode cladding;
   a housing enclosing an effective length of said fiber; and
   a liquid component contained within the housing and surrounding said fiber within said housing, said liquid component having an index of refraction $n_4$ wherein $n_1 > n_2 > n_3$ and $n_2 \geq n_4$.

2. An optical fiber comprising:
   a substantially single mode core having an index of refraction $n_1$ comprising a laser material, and disposed within a multimode cladding Baring an index of refraction $n_2$; and
   a further cladding having an index of refraction $n_3$ surrounding said nultimode cladding, said further cladding including a liquid component; and wherein $n_1 > n_2 > n_3$.

3. An optical fiber comprising:
   a substantially single mode core having an index of refraction $n_1$ and comprising laser material disposed within a multimode cladding which has an index of refraction $n_2$;
   a further cladding having an index of refraction $n_3$ and surrounding said multimode cladding, said further cladding having at least one liquid component and conforming with the multimode cladding such that scattering sites between said further cladding and said multimode cladding are suppressed at a wavelength of interest and wherein $n_1 > n_2 > n_3$.

4. The optical fiber of claim 3 wherein said fiber is continuously bent along its length.

5. The optical fiber of claim 3 wherein said multimode core and single mode cladding have corresponding cross-sectional areas and the cross-sectional areas of said multimode cladding is substantially larger than the cross-sectional area of said single mode core.

6. The optical fiber of claim 5 wherein the cross-sectional area of said multimode cladding is substantially in the range of 50 to 400 times larger than the cross-sectional area of said single mode core.

7. The optical fiber of claim 5, wherein the cross-sectional area of said multimode cladding taken substantially transverse to the axial extent of the optical fiber has a first path across said area which passes substantially through the geometric center thereof whose length is substantially different from the length of a second path across said area which passes substantially through the geometric center thereof, said second path being substantially perpendicular to said first path.

8. The optical fiber of claim 5 wherein the cross-sectional area of said multimode cladding substantially forms a rectangle.

9. The optical fiber of claim 3 wherein said laser material of said single mode core comprises a rare earth dopant.

10. The optical fiber of claim 9 wherein said laser material comprises rare earth dopants.

11. The optical fiber of claim 3 wherein said single mode core is disposed substantially at the geometric center of said multimode cladding.

12. The optical fiber of claim 3 further comprising a protective coating surrounding said further cladding.

13. The optical fiber of claim 3 wherein said further cladding includes a curable component having an index of refraction such that, when combined with said liquid component, said further cladding exhibits a uniform index of refraction.

14. The optical fiber of claim 13 wherein said curable component swells in the presence of said liquid component.

15. The optical fiber of claim 14 further comprising a protective coating surrounding said further cladding, which protective coating exhibits a tensile strength sufficient to exert a radial stress on said further cladding.

16. The optical fiber of claim 14 further comprising a protective coating surrounding said further cladding, said protective coating being a semipermeable membrane for permitting diffusion of said liquid component into said curable component for suppressing the scattering sites.

17. The optical fiber of claim 3 wherein the single mode core comprises a gain material.

18. An active optical fiber which comprises:
a substantially single mode core having an index of refraction $n_1$ and comprising an active gain material disposed within a multimode cladding having an index of refraction $n_2$;
a further cladding having an index of refraction $n_3$ and surrounding said multimode cladding, said further cladding having at least one liquid component and conforming with said multimode cladding such that scattering sites between said further cladding and said multimode cladding are suppressed at a wavelength of interest and wherein $n_1 > n_2 > n_3$.

19. The active optical fiber of claim 18 wherein said active material comprises a laser species.

20. The active optical fiber of claim 18 wherein said active material comprises a rare earth dopant.

21. The active optical fiber of claim 18 further including a laser pump source for activating the single mode core via said multimode cladding.

* * * * *